United States Patent Office 3,491,656
Patented Jan. 27, 1970

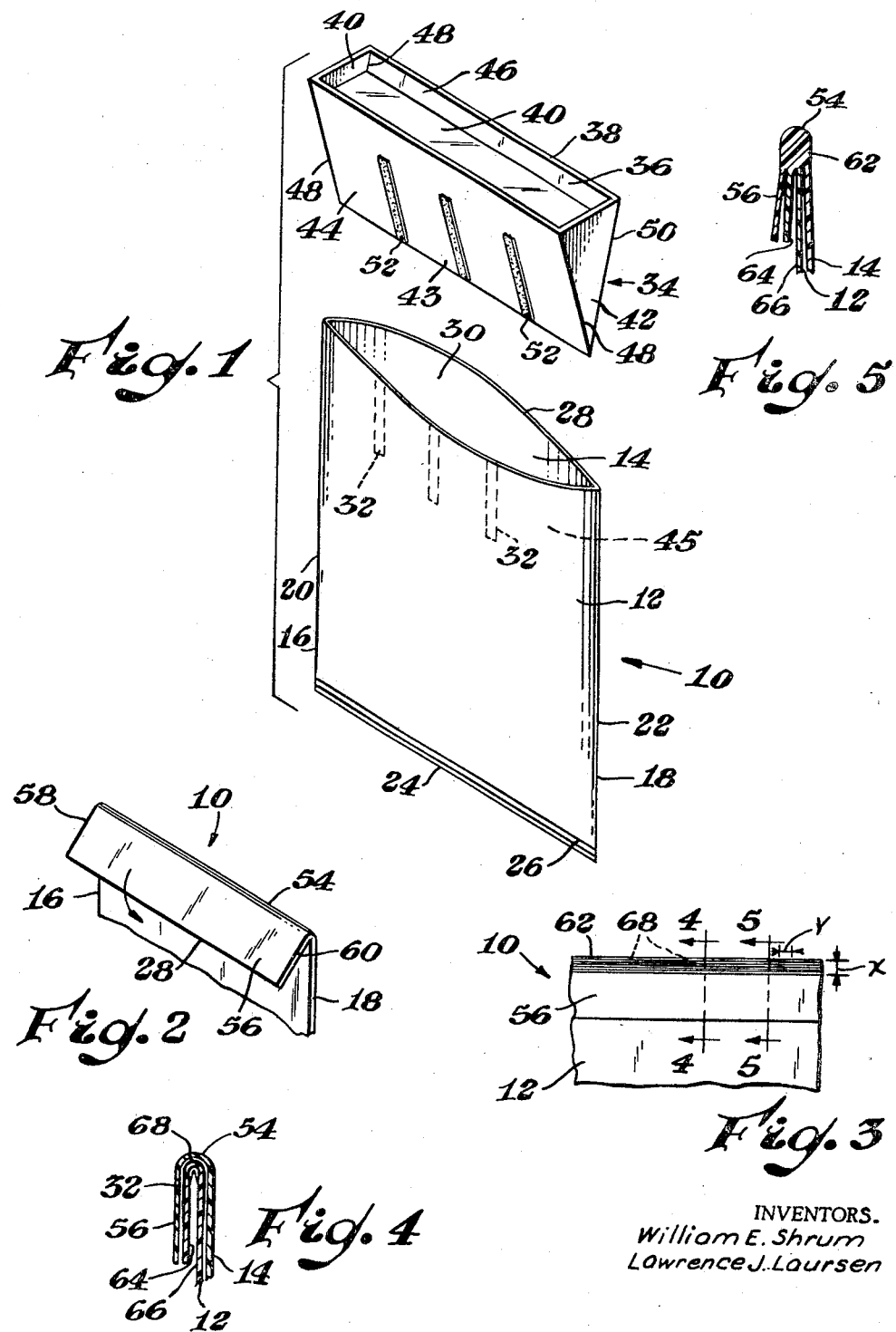

3,491,656
VENTED BAG
William E. Shrum, St. Louis, and Larry J. Laursen, Midland, Mich., assignors to The Dow Chemical Company, Midland, Mich., a corporation of Delaware
Original application Feb. 8, 1968, Ser. No. 703,999, now Patent No. 3,439,869, dated Apr. 22, 1969. Divided and this application Oct. 10, 1968, Ser. No. 798,234
Int. Cl. B31b 49/04
U.S. Cl. 93—35                                    7 Claims

ABSTRACT OF THE DISCLOSURE

This disclosure pertains to a vented bag. Basically the vent is formed by applying to the bag strips of a substance which is not thermally compatible therewith. The strips are located, for example, at inner face portions adjacent the mouth of the bag. Because of the non-compatible nature of the strips, a perfect or full closure of the mouth by heat sealing is prevented, thereby obtaining vents at the non-sealed area where the strips are located. Vent constructions as described herein are substantially leak-proof even for such finely divided granular products as salt, sugar, talc and the like.

---

This is a division of application Ser. No. 703,999, filed Feb. 8, 1968, now Patent No. 3,439,869, issued Apr. 22, 1969.

Description of the invention

Heavy duty plastic bags are useful in the packing of a considerable number of products as, for example, fertilizers, talc, sugar, feeds and potatoes. Usually these bags are of relatively thick walled construction so as to provide for packaging of product units of 10, 25, 50 and even 100 lbs. One problem in the application of plastic bags to this field of products is the inability of the plastic to breath, that is, allow air to enter into and exit from the confines of the filled bag. The impermeable nature of plastic bags causes special problems during periods of storage and transportation. For instance, in many warehouses and freight cars, the temperature within the warehouse or car can reach as high as 140° F. Air trapped within these bags tends to expand at such temperatures such that a "pillowing" or "ballooning" of the bag results. "Pillowing" can, in effect, actually cause the upper bags to float on those stacked below such that stacking and palletizing operations are hindered. More importantly, when the bags are stacked to considerable heights, air pressure developed in the bottom bags can be sufficient to cause a bursting of the bag spilling the product contained therewithin.

Attempts have been made in the past to overcome these problems by venting the bags. Often venting is accomplished by intermittently heat sealing the bag such that an air passage or vent is obtained. When employing intermittent heat sealing, it is usual to provide two or more heat seal areas with the unsealed areas staggered to better prevent product leakage. A disadvantage of vents formed in this manner is that usually additional heat sealing steps are required to construct the vent. This adds to fabrication costs. Also, the prior art vents are frequently complex in construction, reducing somewhat their practical applications and uses.

Accordingly, it is an object of the present invention to provide a vented bag wherein the vent is so constructed as to enable packaging of fine granular products as, for example, salt, sugar, fertilizers, foodstuffs and the like without undue leakage of these products through the vent.

Another object of the present invention is to provide a vented bag wherein the vent is of a practical construction in that it can be economically applied to the bag without requiring the need for additional cutting or sealing steps during fabrication operations.

Briefly then, the present invention relates to vented plastic bags and particularly heavy duty vented bags of the kind useful for packaging fertilizers, talc, potatoes and like products. The invention contemplates applying strips or patches of a non-compatible material as, for example, suitable modified cellulose compositions, to selected areas of the bag before the closing and heat sealing thereof such that a perfect closure of the bag is prevented. This concept is used in combination with a particularly advantageous closure arrangement to form a vent that minimizes product leakage problems. Essentially the closure is formed by doubling or folding over the fill opening portion of the bag to close the same, and then melting together the four plies of the folded portion in the seam extending along the fold line. Strips of non-heat sealable material bisect or cross portions of the fold line at inner face locations such that in these areas a vent is formed. Such a vent construction has been found to be leak-proof even for products which are in small granulated form such as those mentioned above.

Other objects and advantages of the present invention and its details of construction will be apparent from a consideration of the following specification and accompanying drawings wherein:

FIGURE 1 is an isometric view of a method of applying thermally non-compatible strips of material to the bag in accordance with the principles of the present invention;

FIGURE 2 is a fragmentary view of the bag of FIGURE 1 showing a first step in closing the fill opening thereof;

FIGURE 3 is a fragmentary front view of the bag of FIGURE 1 after completion of the vent construction;

FIGURE 4 is a cross-sectional view of the bag of FIGURE 3 taken along reference line 4—4, and illustrating the vent construction of the present invention; and FIGURE 5 is a cross-sectional view of the bag of FIGURE 3 taken along reference line 5—5 and illustrating the seal employed to close the fill opening of the bag.

Referring more particularly to the drawings there is shown in FIGURE 1, a thermoplastic bag 10 formed from a cut length of thermoplastic tubing sealed across one end to provide a three-sided enclosure, and open across the other end to provide a fill opening.

More specifically, bag 10 includes a front wall 12 and rear wall 14 joined together along the sides 16 and 18 of bag 10 by folds 20 and 22. A seam 26 extends across the bottom or first end 24 of bag 10 securing together therealong walls 12 and 14. Seam 26 can be formed, for example, by heat sealing. Walls 12 and 14 remain unsecured across the top or second end 28 of bag 10 to form a fill opening or mouth 30 through which bag 10 can receive the product to be packaged.

The structure of the bag 10 so far described is similar to the bags of the known prior art. Similarly, their methods of fabrication and material construction are matters of common knowledge among those concerned with the manufacture of thermoplastic bags.

The inventive concept pertains to the three strips 32 located on inner face or interface portion 45 of front wall 12 adjacent the top end 28 of bag 10. Strips 32 comprise coatings of layers of a substance which is not heat-sealable or thermally compatible with the bag 10 material. Essentially the non-heat sealable quality of strips 32 prevents a perfect heat seal closure of the fill opening 30 of bag 10 such that a vent construction can be obtained as will be explained more fully hereinafter.

The preferred method of forming strips 32 on front wall 12 is by applying the strips in solution form as is illustrated in FIGURE 1. For this purpose, there is provided an applicator 34 disposed above bag 10 and adapted to be received therein during application of the solution to front wall 12. Applicator 34 generally comprises a reservoir 36 open at its top portion 38 and containing therewithin the solution 40. Specifically reservoir 36 is a generally hollowed out elongated triangular shaped piece comprising two inverted triangular shaped end pieces 40 and 42 joined in bin-like fashion to two rectangular shaped side panels 44 and 46. Side panels 44 and 46 slope inwardly down the sides 48 and 50 of end pieces 40 and 42 to meet and join together at the bottom 43 of reservoir 36. Three pads 52 of solution absorbent or permeable material as, for example, a suitable open celled sponge rubber, felt cloth or the like, are supported by side panel 44 in spaced relationship to each other and in the vertical plane thereon. The pads 52 extend through the wall thickness of side panels 44 such that there is provided a permeable or absorbent-like communication between the interior confines or reservoir 36 and the exterior surfaces of the pads 52 themselves. Accordingly, solution 40 seeping from reservoir 36 wets the exterior surfaces of the pads 52. By contactingly engaging the pads 52 and the inner face 45 of front wall 12, deposits of solution 40 are left on front wall in the form of strips 32.

After depositing the solution 40 on front wall 12, a drying time can be allowed for the strips 32 to solidify into hardened films or coating of non-compatible or non-heat sealable material.

FIGURE 3 illustrates the closing of the fill opening 30 of bag 10 to obtain the vent construction desired. Of course, prior to closing bag 10, strips 32 are first incorporated with the bag as above described and the bag filled with a product by conventional techniques.

The first closing step comprises doubling over the top end 28 of bag 10 along a fold line 54 selected so as to bisect or cross strips 32 across their shortest dimension. Bag 10 after folding along line 54 presents an integrally attached flap 56 overlying the front wall 12 of the bag. Preferably fold line 54 extends parallel to the top end 28 of bag 10 so that the edges 58 and 60 of flap 56 align with the sides 16 and 18 of bag 10 forming a neat appearing closure.

A heat seal 62 is then effected adjacent and along fold line 54 securing together therealong the four overlying plies comprising the flap 56 and the front and rear walls 12 and 14. A usual method of forming a seal of the kind is by employing radiant heat bars. Heat generating from these bars is directed along fold line 54 such that the plastic in this area enters its heat sealable or fusible state. After the heating step, the heated section is compressed as, for example, by silicon rubber belts, to press together and unite the four plies of bag 10. Preferably seal 62 is subsequently cooled such as by passing the seal 62 between sponge rubber belts impregnated with water to provide a cooling medium. For heavy duty bags of a wall thickness of from about 3 to about 10 mils a seal 62 width, as measured by the distance X in FIGURE 3, of about 1/8 of an inch is sufficient to insure adequate seal strength.

At the location of strips 32, vents 68 are formed as best illustrated in FIGURES 3 and 4. This results because of the thermally non-compatible nature of strips 32 which prevents heat sealing from occurring between the walls 12 and 14 at the location of strips 32 on bag 10.

It is not absolutely necessary that the exterior surface of bag 10 be of a heat sealable quality to form a proper seal 62. In other words, the facing surfaces 64 and 66 of the flap 56 and the front wall 12 respectively need not be united along fold line 54. However, a union in this area does better retain flap 56 in its folded over position and is preferred for this reason.

A suitable solution 40 for forming strips 32 can comprise an aqueous solution for mixed methyl hydroxypropyl cellulose ether characterized by a methyl degree of substitution of about 1.68 to about 1.82 and a hydroxypropyl degree of substitution of about 0.17 to about 0.30. The ether is further characterized by a 100 cps. viscosity grade as measured at a concentration level of 2% in water at a temperature of 20° C. Specifically, the solution 40 can comprise by weight 2% mixed methyl hydroxypropyl cellulose ether, 70% water, 27% methyl alcohol, and about 1% of a wetting agent such as a nonyl-phenol-ethylene oxide condensate as the reaction product of 9–10 moles ethyl oxide per mole of a nonyl-phenol and which is available from The Dow Chemical Company of Midland, Mich. as Dowfax® 9N9. The wetting agent, commonly referred to as surfactant, prevents beading of solution 40 such that a more uniform deposit on front wall 12 is obtained. Methyl alcohol speeds up the drying time.

The mixed methyl hydroxypropyl cellulose ether, which is left as a solidified deposit after the evaporation or drying of solution 40, is highly non-compatible with polyolefin film and sheet materials as, for example, a polyethylene material. Furthermore, at the heat sealing temperatures usually employed for the usual packaging film and sheet materials as, for example, polyethylene, polyvinyl chloride, polyvinylidene (saran), vinyl acetate, and ethylene vinyl acetate copolymer materials the described mixed methyl hydroxypropyl cellulose ether has been found non-fusible or thermally non-compatible with itself. Accordingly, the invention further contemplates applying strips of non-compatible material to the inner face portions of both the front and rear walls 12 and 14 such that the strips on the front wall 12 align or match up with those on the rear wall 14. Thus, the aligned strips of essentially non-compatible mixed methyl hydroxypropyl cellulose ether would, in a similar manner, prevent a perfect closure of the fill opening 30 during the heat sealing and closure thereof such that vents similar to vents 68 would result.

Other materials having sealing and compatibility characteristics like mixed methyl hydroxylpropyl cellulose ether are known to the art and can be employed to form strips 32. For example, the following water soluble or water swellable gums and synthetic polyelectrolytes are non-fusible with thermoplastic film materials: natural gums such as starch, guar, arabic and tragacanth gums; cellulose ethers such as methyl cellulose, carboxyl methyl cellulose, and hydroxyethyl cellulose; polyalkylene oxides such as polyethylene oxide and polypropylene oxide; acrylic polymers such as polyacylamides, polyacrylates and acrylic acid acrylamide copolymers, polymer sulfonates, such as polystyrenesulfonate, polyethylenesulfonate, poly-N-vinylpyrrolidones, and poly-N-vinyloxazolidones.

The vent 68 construction as described has been found to be highly leak resistant for even finely divided or granulated products such as powdered sugar, granulated sugar, particulated fertilizers, talc and the like. In fact, for vent widths (Y) of much less than about 3/8 of an inch, even the passage of air through the vent becomes difficult. Preferably, the width of vent 68 is in the range of about 3/8 inch to about 3/4 of an inch for heavy duty plastic bags of dimensions suitable for handling product units of ten or more pounds. In vent constructions of much over 3/4 of an inch, some leakage of the granulated kinds of products as, for example, those mentioned above, has been experienced.

In continuous operations it may be desired to form heat seal 62 before strips 32 have entirely solidified or possibly even before solidification has begun at all. This will be found to be possible in most applications since the heat applied along fold line 54 to form seal 62 will also serve to evaporate the volatile components of solution 40, solidifying the thermally non-compatible substances comprising strips 32.

As is apparent from the disclosure herein the point of time of application of the solution to the bag 10 need only precede the closure and seam forming operations. In a continuous bag forming operation, it would likely be desired to apply the solution 40 to the material to be used to form the bag 10 prior to the actual forming of the bag itself. This can be done by programming the location of strips 32 such that when the bag is fabricated the strips fall at the desired location as, for example, at the interface portion of front wall 12 as illustrated in FIGURE 1. Application of the strips 32 can be accomplished immediately after extrusion or forming of the film or sheeting to be used to form the bag, or at points thereafter, such as immediately prior to fabricating the bag.

While the present invention has been described with particular attention to the structure of bag 10, considerable diversity of somewhat different bag constructions are known as, for example, those having gusseted sides or bottoms. As should be readily apparent, these bags can be employed in the practice of the principles of the present invention with only minimal modifications thereof where applicable. It should be further readily apparent that the location of the vents of the present invention can be at either the top or bottom ends of the bag as desired. Particularly if vents are located at the bottom end 24 of bag 10, the vent construction can be completed prior to filling operations.

While it is preferred that the interface portions of bag 10 to be secured have heat sealable characteristics, they might otherwise be secured together at locations other than vent 68 by solvent or adhesive welding.

For example, only materials suitable for bag 10 and having sealable qualities are, polystyrene, polyethylene, polyvinyl chloride, ethylene vinyl acetate copolymers and the like.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A method of forming a vented bag from tubing, said tubing having interior and exterior surfaces and at least one open end, the interior surface of said tubing being of heat sealable quality, said method comprising:
   (a) applying a substance to a portion of the interior surface of said tubing, said substance being thermally non-compatible with that portion of the interior surface of said tubing located opposite to said substance,
   (b) thereafter folding said tubing to close said open end to form a flap overlying the exterior surface of said tubing with the fold line, thereof crossing the location of said thermally non-compatible substance,
   (c) applying heat about said fold line sufficient to form a heat seal, said heat seal joining together thereat along at least the interior surface portions of said flap and at least the interior surface portions of said tubing respectively, said thermally non-compatible substance further crossing the area of said heat seal to prevent sealing from occurring at the location of said substance on said tubing, thereby providing a vent for said bag.

2. The method of claim 1 wherein said length of tubing is continuous and wherein said method includes the additional step of cutting said tubing into suitable lengths for the packaging of a desired product weight, and wherein said cutting step is prior to said folding and heating steps.

3. The method of claim 1 wherein said substance is applied to at least two interior surface areas of said bag with the areas of application being in superposed relationship when the tubing is folded and sealed along the fold line.

4. The method of claim 1 wherein said substance is applied in the form of a strip substantially tangential to said fold line and wherein said strip has a width dimension of between about ⅜ of an inch and about ¾ of an inch.

5. A method of forming a vented bag wherein said bag has at least front and rear walls and includes at least one open end, said method comprising:
   (a) locating a substance on the bag material such that it falls on a portion of the interior surface of one of the walls of said bag, said substance being non-compatible with the portion of the inner face of the other wall of said bag located opposite thereto,
   (b) folding over the walls of said bag to close again said open end, said folding step forming a flap overlying one of said walls, and a fold line crossing said thermally non-compatible substance,
   (c) forming a seal adjacent to and extending along the fold line of said bag, said seal securing together at least the inner face portions of the flap and the inner face portions of the front and rear walls respectively, said non-compatible substance further crossing said seal such that at the crossing location a vent is provided, said vent communicating between the confines of the bag and the space exterior thereto.

6. The method of claim 4 wherein said seal is a heat seal and wherein the interior surfaces of said walls are of heat sealable quality.

7. The method of claim 1 wherein both the interior and exterior surfaces of said bag are of heat sealable quality and wherein the application of heat along said fold line joins together all of the plies of the bag located thereat.

References Cited

UNITED STATES PATENTS 3,088,255   5/1963   Griem _____ 53—14
3,355,997   12/1967  Heimos et al. _____ 93—35

BERNARD STICKNEY, Primary Examiner

U.S. Cl. X.R.

53—14